United States Patent [19]

Patel et al.

[11] 3,831,194

[45] Aug. 20, 1974

[54] DIGITAL DATA RECOVERY SYSTEM WITH CIRCUITRY WHICH CORRECTS FOR PEAK SHIFTING

[75] Inventors: Ramesh S. Patel, Lowell; David S. Dunn, Windham, both of Mass.

[73] Assignee: Honeywell Information Systems Inc., Waltham, Mass.

[22] Filed: July 19, 1973

[21] Appl. No.: 380,809

[52] U.S. Cl. .................................................. 360/45

[51] Int. Cl. .............................................. G11b 5/44

[58] Field of Search...340/174.1 A, 174.1 B, 174.1 H

[56] References Cited

UNITED STATES PATENTS

| | | | |
|---|---|---|---|
| 3,503,059 | 3/1970 | Ambrico | 340/174.1 H |
| 3,643,228 | 2/1972 | Lipp | 340/174.1 H |
| 3,656,149 | 4/1972 | Srivzstz et al. | 340/174.1 H |

*Primary Examiner*—Vincent P. Canney
*Attorney, Agent, or Firm*—Ronald T. Reiling; William F. White

[57] ABSTRACT

A system is disclosed which recovers digital data from a magnetic storage medium and corrects for the peak shifting which may occur in the readout signal from the magnetic transducer. The disclosed invention corrects for peak shifting of up to one quarter of a bit cell period. In a preferred embodiment of the invention, a system is disclosed for correcting for the peak shifting of a particular digitally coded read out signal, namely, that of three frequency digital coding.

20 Claims, 4 Drawing Figures

DIGITAL DATA RECOVERY SYSTEM WITH CIRCUITRY WHICH CORRECTS FOR PEAK SHIFTING

BACKGROUND OF THE INVENTION

This invention relates to the reading out of digital data from a magnetic storage device. In particular, this invention relates to a manner of correcting for peak shifts in the data signal that is being read from a magnetic media.

A digital signal that is being generated by the read head of a dynamic magnetic storage device usually consists of a series of high and low peaks which represent changes in the magnetic state of the storage medium. These changes in magnetic state within the magnetic medium represent the digital data that has previously been recorded on the magnetic media. This recording is done in accordance with a particular digital coding technique that dictates when these changes in magnetic state will occur relative to a bit cell period. The bit cell period is usually defined by a set of spaced pulses which are part of an overall clock signal.

Theoretically, the peaks within the readout signal that are being generated by the read head will occur relative to the bit cell periods in the precise manner previously dictated by the particular digital coding technique used in recording the data. However, due to the magnetic properties of the recording media, the particular characteristics of the read head and the particular format of the data, these peaks will often shift. This peak shifting will moreover occur so abruptly that a clock signal which is normally in synchronization with the readout signal will not have had sufficient time to adjust or react to the peak shift. This abrupt peak shifting relative to a bit cell period may lead to a drop-out in the data being recovered.

OBJECTS OF THE INVENTION

It is an object of the present invention to provide a digital data recovery system that corrects for peak shifting that may occur within the readout signal being generated by the read head of a magnetic storage device.

It is another object of the present invention to provide apparatus which corrects for the shifting of data peaks relative to clock pulses that are generally in synchronization with the readout signal.

It is a still further object of the present invention to provide an apparatus which corrects for the peak shifting of the data peaks relative to clock pulses for a particular type of digital code, namely, the "three frequency" digital code.

SUMMARY OF THE INVENTION

The above objects are achieved according to the present invention by providing a peak shift compensating circuit within a read chain of logic which is normally connected to the read head of a magnetic storage device. This peak shift compensating circuit is capable of compensating for a peak shift of just slightly less than 25 percent of the bit cell period. The peak compensating circuit corrects for this much deviation in either direction from the time in which the peak is normally designated to occur.

In a preferred embodiment, a data recovery system is disclosed which corrects for the peak shifting in the digital data code commonly referred to as "three frequency." This particular recovery system contains two separate processing networks within the compensation circuit. Each processing network operates on a particular type of data peak occurring in the "three frequency" digital data code.

BRIEF DESCRIPTION OF THE DRAWINGS

For a better understanding of the present invention, reference should be made to the accompanying drawings wherein.

DESCRIPTION OF THE PREFERRED EMBODIMENT

Figure 1:
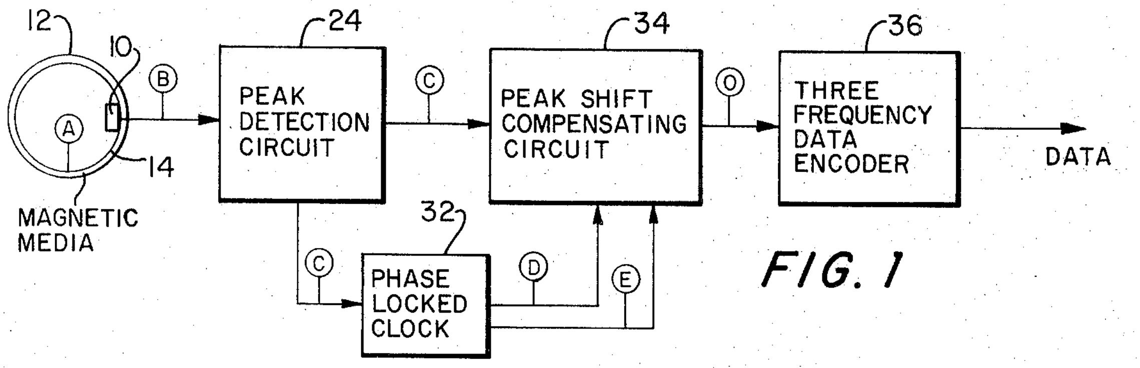
FIG. 1 shows a read chain of logic for recovering digital data stored on a magnetic media.
Figure 3:
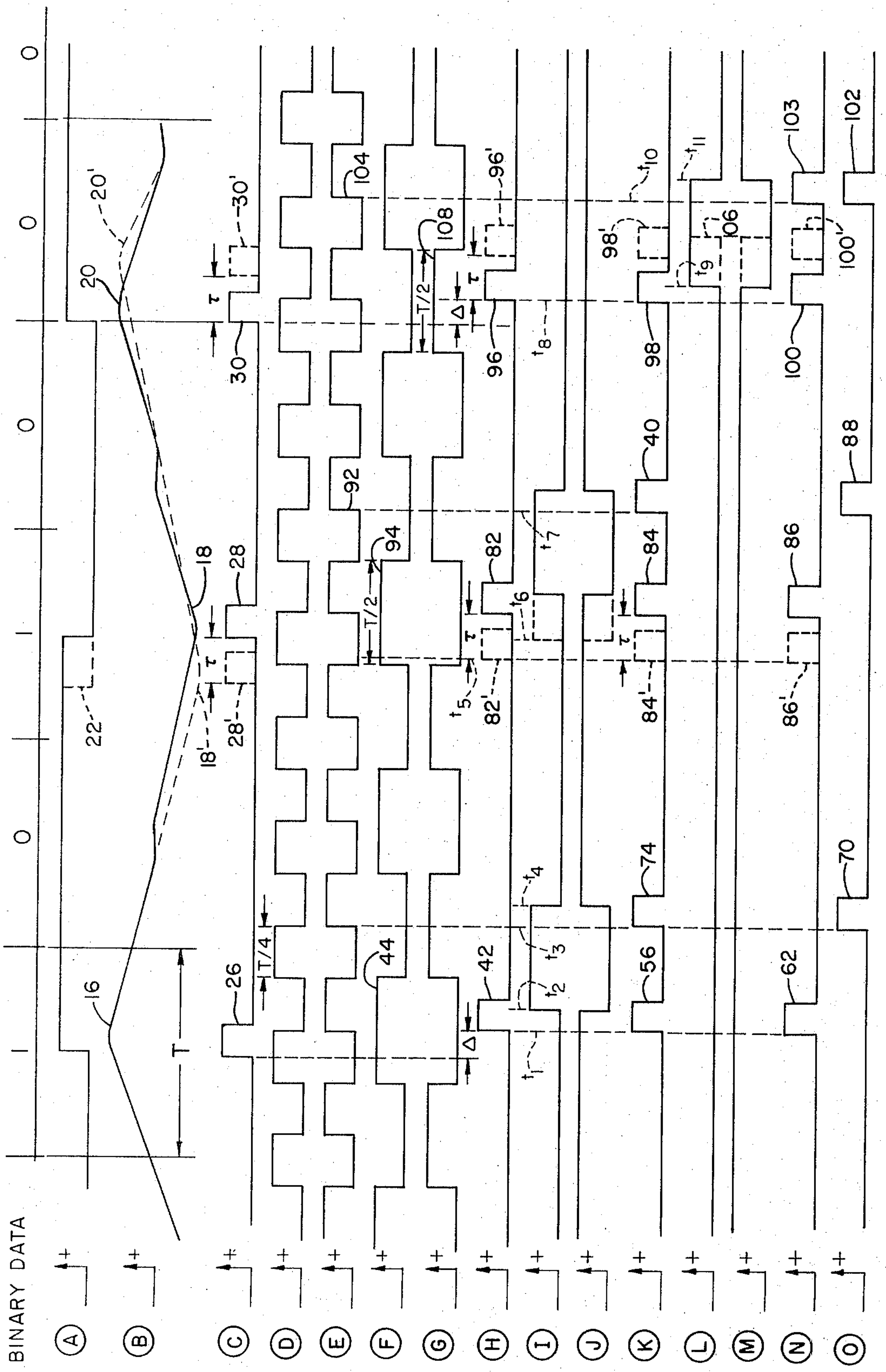
FIG. 3 illustrates the various signals occurring at the denoted locations of FIGS. 1 and 2.

Referring to FIG. 1, a read head 10 is schematically shown in transducing relationship with a moving magnetic disc 12. The read head 10 is centered on a particular data track 14 which contains a series of previously recorded magnetic states A such as shown in FIG. 3. Referring to FIG. 3, the actual binary data which has been recorded on the magnetic disc 12 appears immediately above the recorded magnetic states A. A comparison between the actual binary data and the recorded magnetic states A reveals that a magnetic flux reversal occurs at the center of each bit cell containing a ONE value of binary data and that a magnetic flux reversal occurs between successive bit cells containing ZERO values of binary data. This type of coding of binary data results in three possible frequencies of periodic magnetic flux reversals in the recorded data and is hence commonly referred to as the "three frequency" code.

The flux transitions recorded on the moving magnetic disc 12 are sensed by the read head 10 which in turn produces a data readout signal B such as shown in FIG. 3. The data readout signal B in FIG. 3 goes through a series of maximums and minimums denoted as peaks 16, 18 and 20. It is to be appreciated that these peaks may shift due to the magnetic properties of the magnetic disc 12, the particular manner in which the data was recorded, the particular characteristics of the read head 10, and the particular format of the data. This peak shifting phenomena is illustrated by the dotted pattern deviations in the data readout signal which define the shifted peaks 18' and 20'. It should be noted that the shifted peak 18' occurs prematurely due to a premature change in magnetic state as indicated by the magnetic flux reversal 22. A premature peak can usually be attributed to an original recording error which would introduce the magnetic flux reversal 22 at an earlier time than desired. This is to be contrasted with the shifted peak 20' which occurs later. This late occurrence of the shifted peak 20' can usually be attributable to the magnetic properties of the disc 12, the particular characteristics of the read head 10 and the particular format of the data.

Returning to FIG. 1, it is seen that the data readout signal B from the read head 10 is applied to a peak detection circuit 24 which produces a pulse for each detected peak, as indicated by the data pulse signal C in FIG. 3. The pulses 26, 28 and 30 correspond to the peaks 16, 18 and 20. The shifted pulses 28′ and 30′ correspond to the shifted peaks 18′ and 20′.

The data pulse signal C is preferably applied to a phase locked clock 32 as is shown in FIG. 1 which generates a set of clocking signals D and E as shown in FIG. 3. The clock signals D and E of FIG. 3 preferably have pulse widths of T/4 with a spacing between pulses of T/2. This is to be contrasted with a bit cell time period of length T.

The phase locked clock 32 is shown as phase locking onto the data pulse signal B. Such a phase locked clock is disclosed in commonly assigned U.S. Pat. No. 3,689,903, issued on Sept. 5, 1972, to Agrawala, et al. It should be noted that the phase locked clock of U.S. Pat. No. 3,689,903 does not generate precisely the same clocking signal as that of phase locked clock 32. The VCO output of the phase lock loop in U.S. Pat. No. 3,689,903 consists of pulses which, while spaced one-half of a bit cell apart, occur at a location one-quarter of the way into the bit cell, and at a location three-quarters of the way into the bit cell. This is to be contrasted with the clock signal D of FIG. 3 wherein the leading edge of a clock pulse occurs at three-eighths of a bit cell period and again at seven-eighths of a bit cell period. In order to derive the precise pulse occurrence of the clock signal D of FIG. 3, it is therefore necessary to delay the VCO output of U.S. Pat. No. 3,689,903 by one-eighth of a bit cell period. In order to obtain the precise pulse width of T/4 in the clock signal D, it is necessary to further feed the delay VCO output into a one shot circuit which is timed to produce clock pulses having a pulse width of one-quarter of a bit cell period. Once the VCO output has thus been delayed and pulse shaped, the clock signal D will have been generated. The clock signal E can then be generated by merely feeding clock signal D through an inverter to produce the negation thereof. It is to be noted that while a particular phase locked clock 32 has been disclosed for producing clock signals D and E, there nonetheless remain other employable clocking schemes which may or may not be phase locking with respect to the data signal.

The data pulse signal C together with the clocking signals D and E are applied to a peak shift compensating circuit 34 as shown in FIG. 1. According to the invention, the peak shift compensating circuit 34 corrects for shifts in the pulses within the data pulse signal C. The peak shift compensating circuit 34 is capable of correcting for a peak shift of $\tau$ in either of two directions as is indicated by the shifted pulses 28′ and 30′ in FIG. 3. The resulting train of data pulses appears as a corrected data pulse signal 0 at the output of the peak shift compensating circuit 34. The corrected data pulse signal 0 is applied to the input of a three frequency data encoder 36 which identifies the data pulses of the corrected data pulse signal 0 and provides the final data identification. This final data identification is easily facilitated when a train of pulses is provided that is properly timed relative to a clocking signal. Such a pulse train is provided in the corrected data pulse signal 0.

Figure 2:
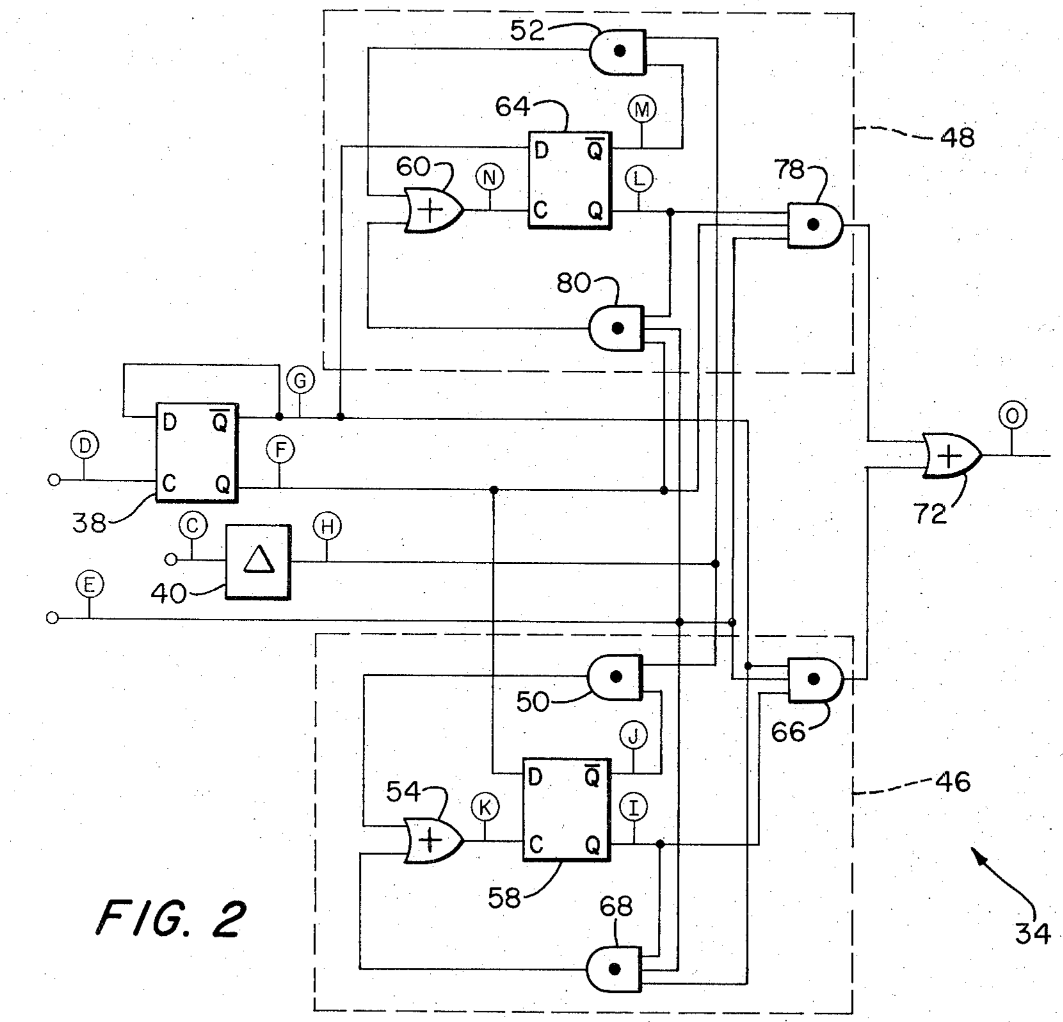
FIG. 2 shows in detail the peak compensating circuit within the read chain of logic of FIG. 1.

FIG. 2 is a detailed circuit logic diagram of the peak shift compensating circuit 34 of FIG. 1. It will be remembered that the peak shift compensating circuit 34 receives as inputs, the clocking signals D and E and the data pulse signal C. The peak shift compensating circuit provides as an output the corrected data pulse signal 0. Before beginning a detailed description of the peak shift compensating circuit 34 of FIG. 2, it should first of all be noted that the circuit consists of a number of bistable devices commonly referred to as D type edge-triggered flip-flops. Each of these flip-flops are self-initializing and trigger on the leading edge of an appropriately applied pulse. Leading edge triggered flip-flops that are self-initializing may be obtained from Texas Instruments, Dallas, Tex., and are identifiable as Numbers TI7474, 74S74, and 74H74 according to The Integrated Circuits Catalog for Design Engineers. Referring to FIG. 2, each flip-flop contains a set of inputs identifiable as C and D inputs and a set of outputs identifiable as Q and $\overline{Q}$ outputs. Each flip-flop operates so as to cause its Q output to follow the signal appearing at the D input upon the occurrence of a leading edge of a pulse applied to the C input. The signal at the $\overline{Q}$ output merely reflects the negation of the signal at the Q output. In other words, the Q output follows the level of the D input upon the occurrence of a leading edge of a pulse applied to the C input. The $\overline{Q}$ output merely reflects the negation of the Q output at any time.

Turning now to a functional description of the compensating circuit 34 and first of all to a description of the initial processing of the data pulse signal C and the clocking signals D and E which appear at the inputs to the circuit. The clocking signal D is first of all seen to be applied to the C input of a flip-flop 38. A feedback between the $\overline{Q}$ output and the D input of the flip-flop 38 sets up a toggle action whereby the Q output toggles (that is changes levels) upon the occurrence of a leading edge of each pulse in the clocking signal D. This toggle action is shown by the timing signal signal F of FIG. 3 which appears at the Q output of the flip-flop 38 as shown in FIG. 2. It is to be noted that the clocking signal D has a periodicity of T/2 whereas the timing signal F has a periodicity of T. It is also to be noted that the negation of the timing signal F appears at the $\overline{Q}$ output of the flip-flop 38 and is shown as the timing signal G in FIG. 3.

The data pulse signal C is applied to a delay 40 which delays the pulses of the data pulse signal C by an amount $\Delta$ as illustrated by the delayed pulse signal H which appears at the output of the delay 40. Referring to FIG. 3, the amount of delay $\Delta$ is particularly shown between a pulse 42 in the delayed pulse signal H and the pulse 26 in the data pulse signal C. The delay 40 is seen to effectively delay the pulse 26 so as to cause the leading edge of the resulting pulse 42 to occur at the center of a high level 44 in the timing signal F (or a corresponding low level in the timing signal G). The amount of delay $\Delta$ necessary to accomplish this positioning of the leading edge of the pulse 42 is one half of a clock pulse width or T/8 for the signals C, F and H of FIG. 3.

Having described the initial processing of the clocking signals D and E and the data pulse signal C, attention will now be turned to a set of two separate processing networks 46 and 48 which are denoted as dotted blocks in FIG. 2. Each of these processing networks responds to a different set of conditions within the signals E through H, so as to generate a particular type of data pulse in the corrected data pulse signal O. This will be fully explained hereinafter.

The delayed pulse signal H is applied to a set of AND gates 50 and 52 within the respective processing networks 46 and 48. The delayed pulse signal H is ANDed with a signal J at the AND gate 50 within the processing network 46 and is ANDed with a signal M at the AND gate 52 within the processing network 48. Referring to the signals J and M in FIG. 3, it is seen that each of these signals are logically high at a time $t_1$ when the leading edge of the pulse 42 in the delayed pulse signal H occurs. This condition produces logically high signals out of both of the AND gates 50 and 52. First, taking the logically high signal out of the AND gate 50 within the processing network 46, it is seen that this signal is applied to an OR gate 54 which produces a pulse 56 in a signal K appearing at its output. The pulse 56 in the signal K is applied to the C input of the flip-flop 58. Returning for a moment to the processing network 48, the logically high signal out of the AND gate 52 is applied to an OR gate 60 which produces a pulse 62 in the signal N appearing at the output of the OR gate 60. The pulse 62 in the signal N is applied to the C input of a flip-flop 64.

It is thus seen that the pulse 42 occurring in the delayed pulse signal H is gated through to the flip-flops 58 and 64 in each of the respective processing networks 46 and 48. The manner in which the flip-flops 58 and 64 react to the pulse 42 will now be discussed. It will be shown that the flip-flops 58 and 60 react differently to the pulse 42 due to the signal conditions within the respective processing networks 46 and 48.

Turning first to the flip-flop 58 within the processing network 46, it is seen that the timing signal F is applied to the D input of this flip-flop. The timing signal F is seen to be logically high at time $t_1$ when the leading edge of the pulse 56 of signal K is applied to the C input of the flip-flop 58. This causes the flip-flop 58 to change state so as to follow the high level of the timing signal F as indicated by the signal I changing from low to high at a time $t_2$. This signal change from low to high in the signal I does not occur until time $t_2$ due to a slight delay in the flip-flop 58. At the same time $t_2$, the signal J at the $\overline{Q}$ output of the flip-flop 58 goes low, reflecting the negation of the signal I. When the signal J goes low at time $t_2$, the signal out of the AND gate 50 goes low thus causing the pulse 56 of the signal K to go low. Proceeding on until time $t_3$ in FIG. 3, it is seen that at time $t_3$, the signal I, the clocking signal E and the timing signal G are all logically high. This condition produces a logically high signal out of a set of AND gates 66 and 68, each of which ANDs the signals I, E and G together as is shown in FIG. 2. The logically high signal out of the AND gate 66 produces a pulse 70 in the corrected data pulse signal 0 which appears at the output of an OR gate 72. The logically high signal out of the AND gate 68 produces a pulse 74 in the signal K appearing at the output of the OR gate 54. The pulse 74 is applied to the C input of the flip-flop 58 causing its Q output to follow the level of the signal F applied to its D input. This results in the signal I going low at a time $t_4$ due to signal F which is low at that time. The delay in the signal I going low is attributable to a delay in the flip-flop 58. The low level of the signal I after time $t_4$ causes the outputs of the AND gates 66 and 68 to go low thus causing the pulses 70 and 74 in the signals 0 and K appearing at the outputs of the OR gates 72 and 54 to go low.

The processing network 46 is thus seen to produce a pulse 70 in the corrected data pulse signal 0 in response to the pulse 42 in the delayed pulse signal H. It will be remembered that the pulse 42 resulted from the initial occurrence of the pulse 26 which represented an encoded digital value of ONE according to the three frequency coded data of FIG. 3. It will now be shown that the processing network 48 will not respond to the same pulse 42. It will later be shown that the processing network 48 responds to a different delayed pulse resulting from the occurrence of a differently coded pulse in the data pulse signal C.

Returning now to the processing network 48 and to the flip-flop 64, it is seen that the timing signal G is applied to the D input of this flip-flop. The timing signal G is seen to be logically low at time $t_1$ when the leading edge of the pulse 62 of the signal N is applied to the C input of the flip-flop 64. Hence the signal L appearing at the Q output of the flip-flop 64 follows the logically low level of the timing signal G at time $t_1$ and remains low. Thus both the signals L and M at the Q and $\overline{Q}$ outputs of the flip-flop 64 remain unchanged. The low level of the signal L inhibits both the AND gates 78 and 80. Since the AND gate 78 constitutes the output gate from the processing network 48, it is seen that the processing network 48 will not propagate a pulse.

In summary, it is seen that the pulse 26 in the data pulse signal C of FIG. 3 is initially processed through the delay 40 to thereafter appear as the pulse 42 which is applied to both of the processing networks 46 and 48. Due to the particular signal conditions within the processing networks, it is seen that only the processing network 46 produces a pulse 70 at the output of the entire compensating circuit 34. It is furthermore seen that the leading edge of the pulse 26 occurs precisely at the mid-point of a bit cell period. It is therefore to be understood that the compensating circuit 34 was not required to compensate for any shifting in the pulse 26.

Turning now to a situation in the data pulse signal C of FIG. 3 wherein a pulse is shown which does not occur at the precisely designated time. The pulse 28′ is shifted an amount $\tau$ from the precise time in which it should have occurred as indicated by the normal pulse 28. It will be shown that the compensating circuit 34 compensates for this shifting and outputs the same pulse for either the normal pulse 28 or the shifted pulse 28′.

Referring to FIG. 3, it is seen that the pulse 28′ occurs prematurely in the data pulse signal C by an amount $\tau$. This causes a premature pulse 82′ to be produced at the output of the delay 40 in FIG. 2. The premature pulse 82′ is ANDed with the logically high levels of the signals J and M which appear at the AND gates 50 and 52. This produces logically high signals out of each AND gate 50 and 52 which in turn produce the pulse 84′ (signal K) and the pulse 86′ (signal N) out of the OR gates 54 and 60. The leading edges of the pulses 84′ and 86′ occurring at the time $t_5$, trigger the flip-flops 58 and 64 causing the flip-flop 58 to go from low to high (signal I) while the flip-flop 64 remains low (signal L). The flip-flop 58 going high indicates that the processing network 46 will be active while the processing network 48 will be inactive.

Looking specifically at the processing network 46, the signal I going high at time $t_6$ combines with the signals E and G at time $t_7$ to produce high signals out of the AND gates 66 and 68. The high signal out of the AND gate 66 produces a pulse 88 in the corrected data pulse signal 0 appearing at the output of the OR gate 72. The high signal out of the AND gate 68 is transmitted through the OR gate 54 and appears as pulse 90 (signal K) which is applied to the C input of the flip-flop 58. The pulse 90 triggers the flip-flop 58 causing its output signal I to go low in response to the signal F being low. With signal I low, the AND gate 66 is turned off and the pulse 88 is terminated. The processing network 46 thus produces a pulse 88 for the shifted pulse 28'.

It will now be illustrated that the same pulse 88 would have been generated in response to a normally occurring pulse 28. Looking at FIGS. 2 and 3, it is seen that a normally occurring pulse 28 would be delayed through the delay 40 so as to result in a pulse 82. The pulse 82 would thereafter be ANDed with the logically high levels of the signals J and M which appear at the AND gates 50 and 52. This would produce logically high signals out of both AND gates 50 and 52 which in turn would produce the pulse 84 (signal K) and the pulse 86 (signal N). The leading edges of the pulses 82, 84 and 86 would all occur at a time $t_4+\tau$. The leading edge of the pulse 84 would trigger the flip-flop 58 causing its output (signal I) to go high, whereas the leading edge of the pulse 86 would not have the same effect on flip-flop 64 due to the timing of signal I at the O output of the flip-flop 58 being high, the pulse 88 would be generated at time $t_7$ by the processing network 46 in the same manner as previously described for the shifted pulse condition.

It is to be appreciated that the signal I appearing at the Q output of the flip-flop 58 must be high at time $t_7$. This is necessary in order for the pulse 88 to be timely generated relative to the leading edge 92 of the clock signal E. This timely generation of the pulse 88 is extremely important and is moreover necessary in order that the pulse 88 be appropriately spaced from the pulse 70 which is also generated relative to a leading edge of the clock signal E.

In order for the signal I to be high on or before time $t_7$, it is necessary that the flip-flop 58 be previously triggered to a high level. It will be remembered that the flip-flop 58 is caused to go high whenever its C input is pulsed, provided that the timing signal F appearing at its D input is also at a high level. Referring to FIG. 3, it is seen that a high level 94 occurs in the signal F for a time period of T/2. Hence, any pulse in the signal K with a leading edge applied to the C input of the flip-flop 58 during the high level 94 will result in the signal I at the Q output going high. Looking at the pulses 84 and 84' in the signal K, it is seen that the leading edge of the pulse 84 occurs precisely at the mid-point of the time period 94, whereas the leading edge of the pulse 84' occurs shortly after the timing signal F has gone high. The shifted amount, $\tau$ between the pulses 84 and 84' illustrates the maximum permissible deviation of the leading edge of the pulse 84' if the same permissible deviation is to be allowed to either side of the pulse 84. Hence, it is to be appreciated that the permissible shift deviation $\tau$ in the data peaks 18 and 18' must be less than one half of the time period 94. Since the duration of the time period 94 is T/2, it follows that $\tau$ must be less than T/4. It is also of course to be understood that this deviation is premised on the leading edge of an optimum pulse, i.e., pulse 84 occurring precisely at the midpoint of the time period 94.

Until now, the peaks of the data readout signal B and the pulses of the data pulse signal C have all been "three frequency" coded representations for binary ONES. This has resulted in the processing network 46 within the compensation circuit 34 being active whereas the processing network 48 has been comparatively inactive. A data situation in the data readout signal B and the data pulse signal C will now be discussed wherein the processing network 48 becomes the active part of the compensation circuit 34.

Referring to FIG. 3, it is seen that a succession of two ZEROs in the recorded data requires a change in magnetic state between the two successive ZERO bit cells. This change in magnetic state causes a peak 20 to occur in the data readout signal B which in turn produces a pulse 30 in the data pulse signal C. It is to be noted that the peak 20 and the pulse 30 occur precisely at the boundary between two successive ZERO bit cells. This is to be contrasted with the preceding peaks and pulses in FIG. 3 which occurred either on or near the mid-cell position.

The pulse 30 is delayed through the delay 40 by an amount Δ and appears as a pulse 96 in the delayed pulse signal H. The pulse 96 is ANDed with the signals J and N at the AND gates 50 and 52 within the respective processing networks 46 and 48. Both AND gates 50 and 52 go high so as to produce the pulses 98 and 100 in the signals K and N.

The leading edge of the pulse 100 occurs at time $t_8$ and triggers the flip-flop 64 causing the signal L appearing at its Q output to go high at time $t_9$. It is to be noted that the signal L has previously remained low for all previously encoded data in FIG. 3. This is attributable to the fact that the flip-flop 64 has never been pulsed at a time when the timing signal G appearing at its D input has been high. The triggering of the flip-flop 64 under the aforementioned timing conditions results in the processing network 48 becoming the active portion of the compensation circuit 34. Proceeding on until time $t_{10}$, it is seen that the AND gate 78 in the processing network 48 will go high in response to the signals L, F and E all being high at its input side. With the output of the AND gate 78 high, a pulse 102 is produced in the corrected data pulse signal 0 appearing at the output of the OR gate 72 which constitutes the output of the compensation circuit 34. Returning for a moment to the internal operation of the compensation circuit 34, it is seen that the AND gate 80 within the processing network 48 will also go high at time $t_{10}$ due to the signals L, F, and E all being high. This results in a pulse 103 in the signal N which is applied to the C input of the flip-flop 64. The pulse 103 triggers the flip-flop 64 causing its Q output to go low at time $t_{11}$ as indicated in the signal L in FIG. 3. With signal L low, the AND gate 78 goes low thereby terminating the pulse 102.

Returning now for a moment to the processing network 46, it is seen that the signal I appearing at the Q output of the flip-flop 58 remains low when the leading edge of the pulse 98 of the signal K is applied to its C input. This happens because the timing signal F which is applied to the D input of the flip-flop 58 is low at the time $t_8$ when the pulse 98 occurs. With signal I low, the AND gate 66 appearing at the output of the processing network 46 remains low.

The processing network 48 also generates the same pulse 102 in the signal O for a delayed pulse 30' in the data pulse signal C. Referring to FIG. 3, it is seen that the pulse 30' is delayed by an amount $\tau$ and that the primed pulses 96', 98' and 100' all occur at a time "$t_8 + \tau$." The pulse 100' triggers the flip-flop 64 high resulting in the dotted line signal 106 of the signal L. The signal L is therefore high at the time $t_{10}$ and combines with the signals F and E to generate the pulse 102 as previously described. It is to be noted that the time $t_8 + \tau$ places the leading edge of the pulse 100' near the trailing edge of a high level 108 in the timing signal G. It will be remembered that the timing signal G must be high in order to trigger the flip-flop 64. Since the pulse 100' should ideally occur at the time $t_8$ which intersects the high level 108 at its midpoint, it follows that the maximum permissible shift deviation $\tau$ must be slightly less than one half of the total time period of the high level 108 or $\tau$ must be less than T/4.

Figure 4:
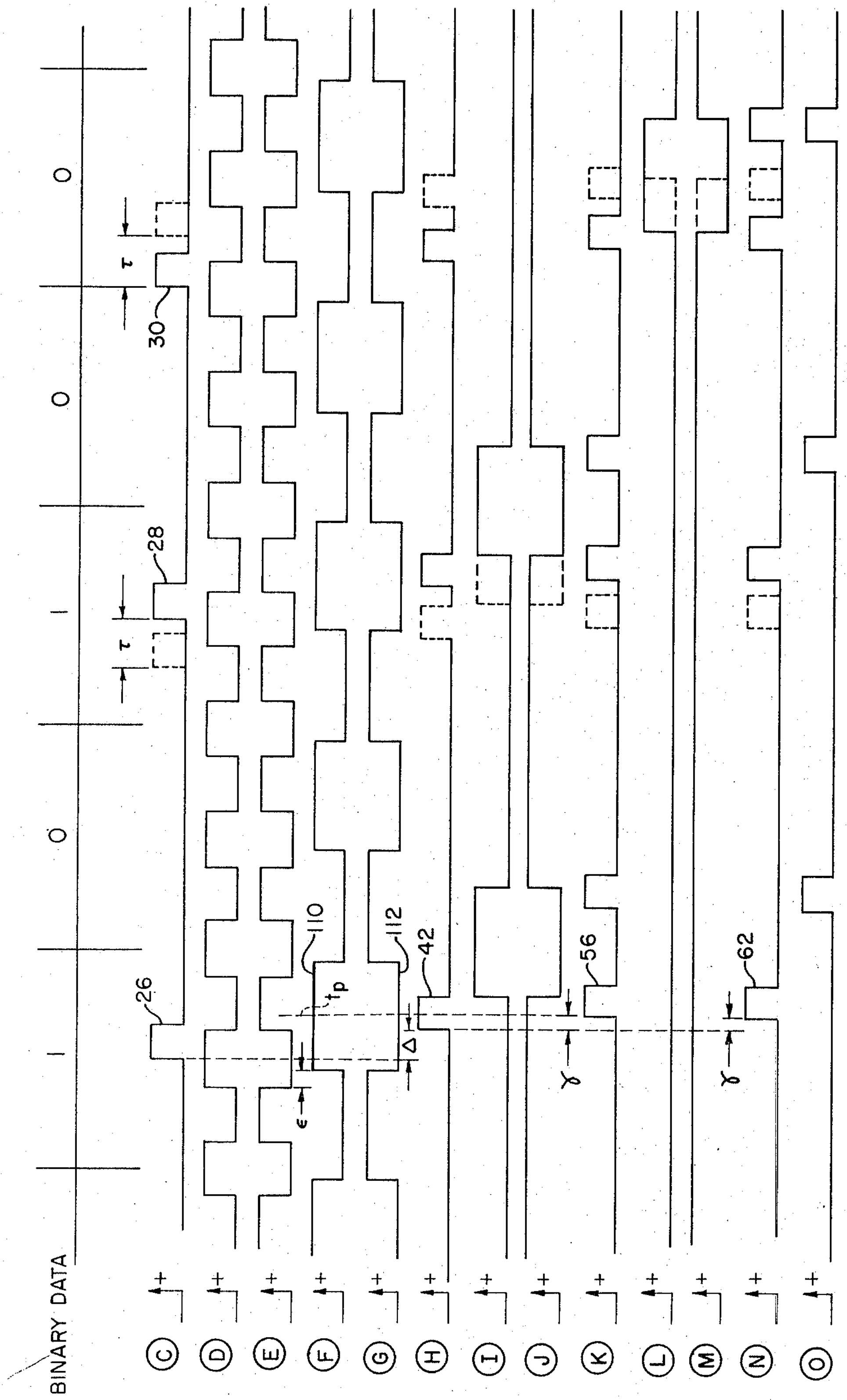
FIG. 4 illustrates the signals of FIG. 3 with certain inherent delays from the circuitry of FIG. 2 having been introduced.

Until now, the circuitry of FIG. 2 has been somewhat idealized in that certain delays inherent in the circuitry have not been included. This has been done in order that the fundamentals of the invention might first be understood. The delays within the circuitry which are of particular importance will now be discussed. Turning to FIG. 4, the signals C through 0 of FIG. 3 are shown with certain delays having been introduced. In this regard, it is first seen that the timing signals F and G have been delayed an amount $\epsilon$ relative to the clock signals D and E. This delay is attributable to the flip-flop 38 having a delayed response to the clock signal D. The data signal C is delayed an amount $\Delta$ through the delay 40 as has been previously discussed. This delay is particularly shown between the leading edge of the pulses 26 and 42. A further delay $\gamma$ occurs between the pulse 42 and the pulses 56 and 62. The delay $\gamma$ is attributable to the inherent delays in two separate gating paths. Referring to FIG. 2, the first gating path consists of the AND gate 50 and the OR gate 54 within the processing network 46. The second gating path consists of the AND gate 52 and the OR gate 60 within the processing network 48.

It will be remembered that the circuitry of FIG. 2 compensates for a certain amount of shift $\tau$ which may occur from time to time in the pulses of the data pulse signal C. In order for the circuitry of FIG. 2 to be capable of the optimum shift compensation of $\tau < T/4$, it is necessary that the pulses 56 and 62 (resulting from the ideal pulse 26 be precisely timed relative to the timing signals F and G. This precise timing requires that the leading edge of the pulses 56 and 62 occur precisely at the middle of a high signal level in the timing signal F. This precise timing is indicated in FIG. 4 by $t_p$ which intersects a high signal level 110 in the timing signal F.

Looking at the delays $\epsilon$, $\Delta$ and $\gamma$ of FIG. 4, it is to be noted that $\epsilon$ and $\gamma$ are inherent delays in the circuitry of FIG. 2 whereas $\Delta$ is an arbitrary delay which is intentionally inserted into the circuitry. According to the invention, the circuitry of FIG. 2 can be carefully tuned by adjusting the delay 40 so as to bring the leading edges of the pulses 56 and 62 into precise alignment with the midpoint of the high signal levels of the timing signal F. The delay 40 in order to be continually adjustable should be of the potentiometer type. An alternative variable delay would be a delay having a number of tapped outputs corresponding to defined increments of delay. It should be noted that it is possible to provide a signal from the magnetic head 10 which would eventually result in pulses such as the pulse 26 which could be relied upon to tune the circuitry of FIG. 2. An example of such a signal would be a recorded string of binary ONES.

In tuning the compensation circuit 34, the following empirical formula can be relied upon:

$$\Delta = T/8 + \epsilon - \gamma.$$

It should be noted that the above formula is based on the clock signal D which bears the same relationship to the data pulse signal C as is shown in FIG. 4. It is also to be noted that a more general formulation for a clock signal having a clock pulse width of W would be:

$$\Delta = W/2 + \epsilon - \gamma.$$

It is furthermore to be noted that the delay of $\gamma$ is a representative delay for the separate gating paths in the separate processing networks 46 and 48. It is therefore necessary that the separate processing networks 46 and 48 be matched so as to achieve approximately equivalent $\gamma$ delays. The necessity for this matching of the processing networks becomes apparent when it is realized that the processing network 48 must correct for any shifting in the pulse 30 in much the same manner as the processing network 46 must correct for any shifting in the pulse 28.

It should be noted that the clocking signals D and E of FIGS. 3 and 4 have been disclosed as having a specific timing relationship with respect to the ideal pulses in the data pulse signal C. It should nonetheless be understood that the circuitry in FIG. 2 can also be tuned to correct for any discrepancy between the clocking signal D and the data pulse signal C. This tuning cannot however rely on the previous stated emperical formula since the formula was based on a proscribed relationship of the signals C and D.

The preferred embodiment of the invention has been limited to the peak detection and peak shift compensation for three frequency coded data. It should nonetheless be understood that it is within the scope of the invention to provide for the peak detection and peak shift compensation of any number of digital codes that are predicated on the occurrence of particular data peaks within or without a defined bit cell period. For example, the NRZ I code requires the presence or absence of a peak at the middle of a bit cell period. This particular code can also be peak detected and peak shift compensated according to the disclosed invention. In this case, only the processing network 46 of the compensation circuit 34 would be necessary.

What is claimed is:

1. In a system for recovering digital data from a magnetic medium employing a recording code which dictates that the data signal transmitted from a peak detector connected to the read head contain data pulses that occur in a prescribed manner relative to bit cell periods of time T, apparatus for compensating for shifting of these data pulses from their normal prescribed manner of occurrence, said apparatus comprising:

means for generating a clock signal consisting of a series of spaced clock pulses having a spacing of T/2 between successive clock pulses;

means for generating a timing signal consisting of a series of timing pulses wherein the spacing between successive timing pulses is T;

bistable means with a first input for receiving the timing signal from said means for generating the timing signal;

means for applying the data pulses to a second input of said bistable means so that the output signal of said bistable means switches from a quiescent level to an active level when a data pulse occurs simultaneously with a timing pulse from the timing signal; and means responsive to the active level of the output signal of said bistable means for generating a corrected data pulse in timed synchronization with a clock pulse.

2. The system of claim 1 wherein said means for applying the data pulses to said bistable means comprises:

means for normally applying the data pulses to said bistable means at the midpoint of a timing signal pulse.

3. The system of claim 2 wherein the data pulses normally occur at the mid-cell position of a bit cell and a clock pulse having a pulse width of W is centered within each bit cell period, and said means for normally applying the data pulses to said bistable means at the midpoint of a timing signal comprises means for delaying the data pulses a delay time of W/2.

4. The system of claim 3 wherein said means for normally applying the data pulses to said bistable means at the midpoint of a timing signal further comprises means for applying the delayed data pulses from said delay means to said bistable means, said means for applying the delayed data pulse having a delay of time $\gamma$, and said means for generating a timing signal having an associated delay of time $\epsilon$ and wherein the delay time of said delay means is $W/2 + \epsilon - \gamma$.

5. The system of claim 2 wherein the timing pulses of said timing signal have a pulse width of T/2 so that the data pulses which are normally applied to said bistable means at the midpoint of a timing pulse may vary plus or minus up to T/4 and still cause said bistable means to switch to an active level.

6. The system of claim 5 wherein the data pulses normally occur at the mid-cell position of a bit cell, the clock pulses each have a pulse width of T/4 with a clock pulse being centered within each bit cell period, and said means for normally applying the data pulses to said bistable means at the midpoint of a timing signal pulse comprises means for delaying the data pulses a delay time of T/8.

7. The system of claim 6 wherein said means for normally applying the data pulses to said bistable means at the midpoint of a timing signal further comprises means for applying the delayed data pulse from said delay means to said bistable means, said means for applying the delayed data pulse having a delay of time $\gamma$, and said means for generating a timing signal having an associated delay of time $\epsilon$ and wherein the delay time of said delay means is $T/8 + \epsilon - \gamma$.

8. The system of claim 7 wherein said bistable means comprises a D type flip-flop wherein the timing signal is applied to the D input of the flip-flop and the delayed pulse from said delay means is applied to the C input of the flip-flop so as to cause the Q output of said D type flip-flop to follow the signal level of the timing signal when the delayed pulse is applied to the C input.

9. The system of claim 8 further comprising:

means for conditionally feeding back the output signal from said D type flip-flop to the C input of said D type flip-flop, said conditional feedback means comprising means for gating the output signal upon the simultaneous occurrence of a clock pulse and the negation of a pulse of said timing signal whereby the output signal of said D type flip-flop switches from the active level and follows the signal level of the timing signal applied to the D input of said D type flip-flop.

10. The system of claim 9 wherein said means for generating a corrected data pulse comprises means for gating the output signal from said bistable means said gating means having an input for receiving clock pulses from the clock signal and an input for receiving pulses representing the negation of the timing signal whereby the output signal is gated upon the simultaneous occurrence of a clock pulse and a pulse representing the negation of a timing pulse of the timing signal.

11. In a system for recovering digital data from a moving magnetic medium which employs a recording code of the "three frequency" type wherein a recorded flux transition normally occurs at the mid-cell position of a bit cell containing a binary ONE and a recorded flux transition normally occurs between successive bit cells containing binary ZEROS, apparatus for correcting for peak shifting in the peaks corresponding to the variously recorded flux transitions which appear in the data signal being transmitted from the read head, said apparatus comprising:

means for detecting the series of peaks in the data signal so as to generate a pulse for each detected peak;

means for delaying each pulse generated by said peak detection means;

means for generating a timing signal and the negation thereof, said timing signal having a spacing of T between successive leading edges of pulses wherein T is the time length of a bit cell period;

a first bistable means having an input for receiving delayed pulses from said delay means and an input for receiving the timing signal, said first bistable means being operative to switch from a quiescent level to an active level when a delayed pulse occurs simultaneously with a timing pulse;

means, responsive to the output signal from said first bistable means, for generating a pulse when the output signal from said first bistable means is at the active level;

a second bistable means having an input for receiving delayed pulses from said delay means and an input for receiving the negation of the timing signal, said second bistable means being operative to switch from a quiescent level to an active level when a delayed pulse occurs simultaneously with a pulse from the negation of the timing signal; and means, responsive to the output signal from said second bistable means, for generating a pulse when the output signal from said second bistable means is at the first level.

12. The system of claim 11 wherein each delayed pulse resulting from an originally detected peak corresponding to a flux transition representative of a binary ONE occurs simultaneously with a timing pulse of said timing signal so as to cause said first bistable means to be operative and wherein each delayed pulse resulting from an originally detected peak corresponding to a flux transition representative of two successive binary ZEROS occurs simultaneously with a pulse from the negation of the timing signal so as to cause said second bistable means to be operative.

13. The system of claim 12 wherein the delay time of said delay means is such as to cause a delayed pulse resulting from an originally detected peak corresponding to a flux transition representative of a binary ONE to normally be applied to said first bistable means at the midpoint of a pulse width of said timing signal and wherein the delay time is such as to cause a delayed pulse from an originally detected peak corresponding to a flux transition representative of successive binary ZEROS to normally be applied to said second bistable means at the midpoint of a pulse width of a pulse from the negation of the timing signal.

14. The system of claim 13 wherein the clock pulses having pulse widths of W occur at the beginning, center and end of each bit cell period and said system further comprises means for applying the delayed pulses from said delay means to the respective inputs of said first and second bistable means for receiving the delayed pulses, said means for applying the delayed pulses having a delay time of $\gamma$, and said means for generating a timing signal having an associated delay of time $\epsilon$ and wherein the delay time of said delay means is equal to $W/2 + \epsilon - \gamma$.

15. The system of claim 13 wherein the timing pulses of said timing signal have a pulse width of T/2 so that the data pulses which are normally applied to said first bistable means at the midpoint of a timing pulse may vary plus or minus up to T/4 and still cause said first bistable means to switch to the active level and wherein pulses from the negation of the timing signal have a similar effect on said second bistable means.

16. The system of claim 15 wherein the clock pulses having pulse widths of T/4 occur at the beginning, center and end of each bit cell period and said system further comprises means for applying the delayed pulses from said delay means to the respective inputs of said first and second bistable means for receiving the delayed pulses, said means for applying the delayed pulses having a delay time of $\gamma$, and said means for generating a timing signal having an associated delay of time $\epsilon$ and wherein the delay time of said delay means is equal to $T/8 + \epsilon - \gamma$.

17. The system of claim 13 further comprising:

means for generating a series of clock pulses and the negations thereof, said clock pulses having a spacing of T/2 between successive leading edges, wherein said means responsive to the output signal from said first bistable means comprises means for gating the output signal from said first bistable means upon the occurrence of the leading edge of a negation of a clock pulse, and wherein said means responsive to the output signal from said second bistable means comprises means for gating the output signal from said second bistable means upon the occurrence of the leading edge of a clock pulse.

18. The system of claim 17 further comprising:

means for conditionally feeding back the output signal from said first bistable means to the input of said first bistable means which receives the delayed pulse from said delay means, said conditional feedback means comprising means for gating the output signal from said first bistable means upon the simultaneous occurrences of a clock pulse and the negation of a pulse of said timing signal whereby the output signal of said bistable means switches from the active level and follows the timing signal level appearing at the input of said first bistable means which receives the timing signal; and means for conditionally feeding back the output signal from said second bistable means to the input of said second bistable means which receives the delayed pulse from said delay means, said conditional feedback means comprising means for gating the output signal from said second bistable means upon the simultaneous occurrence of a clock pulse and a pulse of said timing signal whereby the output signal of said bistable means switches from the first level and follows the negation timing signal level appearing at the input of said second bistable means which receives the negation of the timing signal.

19. In a system for recovering digital data from a magnetic medium employing a recording code which dictates that the data signal transmitted from a peak detector contain at least some data pulses with leading edges normally occurring at the midpoint of a bit cell period of time T, apparatus for compensating for shifting of these data pulses from their normal mid-cell position, said apparatus comprising:

means for generating a clock signal and the negation thereof said clock signal consisting of a series of clock pulses having pulse widths of T/4 and spacings of between successive clock pulses of T/2 and wherein a clock pulse is centered in each bit cell period;

means, responsive to said clock signal, for generating a timing signal consisting of a series of timing pulses wherein the spacing between successive timing pulses is T and the pulse width of each timing pulse is T/2;

means for delaying each data pulse by T/8, bistable means responsive to the simultaneous occurrences of a timing pulse and a delayed data pulse for generating a constant level output signal indicating that a leading edge of a delayed data pulse has occurred within the time period of T/2 as defined by the timing pulse width; and means, responsive to said constant level output signal of said bistable means for generating a corrected data pulse in timed synchronization with the leading edge of a pulse from the negation clock signal.

20. The system of claim 19 further comprising means for applying the delayed pulse from said delay means to the bistable means, said means for applying the delayed pulse having a delay of time $\gamma$, and said means for generating a timing signal having an associated delay of time $\epsilon$ and wherein said means for delaying each data pulse has a delay time of $T/8 + \epsilon - \gamma$.

* * * * *